(12) United States Patent
Mueller et al.

(10) Patent No.: US 11,034,332 B2
(45) Date of Patent: Jun. 15, 2021

(54) TRANSMISSIVE FRONT-FACE HEATER FOR VEHICLE SENSOR SYSTEM

(71) Applicant: ILLINOIS TOOL WORKS INC., Glenview, IL (US)

(72) Inventors: Manfred Mueller, Bayen (DE); Piotr Sliwa, Mount Prospect, IL (US); Edward F. Bulgajewski, Genoa, IL (US)

(73) Assignee: Illinois Tool Works Inc., Glenview, IL (US)

( * ) Notice: Subject to any disclaimer, the term of this patent is extended or adjusted under 35 U.S.C. 154(b) by 854 days.

(21) Appl. No.: 15/521,938

(22) PCT Filed: Oct. 13, 2015

(86) PCT No.: PCT/US2015/055180
§ 371 (c)(1),
(2) Date: Apr. 26, 2017

(87) PCT Pub. No.: WO2016/073144
PCT Pub. Date: May 12, 2016

(65) Prior Publication Data
US 2017/0334397 A1    Nov. 23, 2017

Related U.S. Application Data

(60) Provisional application No. 62/074,211, filed on Nov. 3, 2014.

(51) Int. Cl.
*B60S 1/02* (2006.01)
*H05B 3/84* (2006.01)
(Continued)

(52) U.S. Cl.
CPC .............. *B60S 1/026* (2013.01); *G01S 7/03* (2013.01); *G01S 7/4004* (2013.01);
(Continued)

(58) Field of Classification Search
None
See application file for complete search history.

(56) References Cited

U.S. PATENT DOCUMENTS 3,995,140 A * 11/1976 Kuiff .................. H05B 3/84
219/203
4,135,078 A * 1/1979 Kuiff .................. H05B 3/20
219/203

(Continued)

FOREIGN PATENT DOCUMENTS

CN    201766649 U    3/2011
CN    102753931 A    10/2012
(Continued)

OTHER PUBLICATIONS

ISR & WO for PCT/US2015/055180 dated Jan. 21, 2016; 14 pages.
(Continued)

*Primary Examiner* — Joseph M. Pelham
(74) *Attorney, Agent, or Firm* — Quarles & Brady LLP

(57) ABSTRACT

A heater for vehicular sensors is configured to pass sensing energy and thereby permit placement of the heater directly over the sensing area in the path of the sensed energy. In this way, direct heating of the sensing area is provided minimizing the energy necessary to prevent icing and improving deicing speed.

19 Claims, 4 Drawing Sheets

(51) Int. Cl.
*G01S 15/931* (2020.01)
*G01S 7/40* (2006.01)
*G01S 7/497* (2006.01)
*G01S 7/52* (2006.01)
*G01S 13/931* (2020.01)
*G01S 7/521* (2006.01)
*G01S 7/481* (2006.01)
*G01S 7/03* (2006.01)
*G01S 17/931* (2020.01)
*G01S 13/86* (2006.01)
*G01S 7/02* (2006.01)
*G01S 17/86* (2020.01)

(52) U.S. Cl.
CPC ............ *G01S 7/4811* (2013.01); *G01S 7/497* (2013.01); *G01S 7/521* (2013.01); *G01S 7/52004* (2013.01); *G01S 13/931* (2013.01); *G01S 15/931* (2013.01); *G01S 17/931* (2020.01); *H05B 3/84* (2013.01); *G01S 7/4813* (2013.01); *G01S 13/862* (2013.01); *G01S 13/865* (2013.01); *G01S 13/867* (2013.01); *G01S 17/86* (2020.01); *G01S 2007/027* (2013.01); *G01S 2007/4047* (2013.01); *G01S 2007/4977* (2013.01); *G01S 2007/52011* (2013.01); *G01S 2013/93271* (2020.01); *G01S 2013/93274* (2020.01); *G01S 2015/937* (2013.01); *H05B 2203/006* (2013.01); *H05B 2203/013* (2013.01); *H05B 2214/02* (2013.01)

(56) References Cited

U.S. PATENT DOCUMENTS

| | | | |
|---|---|---|---|
| 4,857,711 A | 8/1989 | Watts | |
| 4,882,466 A | 11/1989 | Friel | |
| 4,931,627 A | 6/1990 | Watts | |
| 6,137,085 A * | 10/2000 | Nakashima | H05B 3/84 219/203 |
| 7,262,388 B2 * | 8/2007 | Moreth | B60Q 1/0005 219/220 |
| 2002/0092849 A1 | 7/2002 | Petrenko | |
| 2002/0130770 A1 | 9/2002 | Keyworth et al. | |
| 2004/0149734 A1 * | 8/2004 | Petrenko | B60S 1/026 219/538 |
| 2006/0086710 A1 | 4/2006 | Meiler et al. | |
| 2007/0154063 A1 * | 7/2007 | Breed | B60N 2/028 382/100 |
| 2008/0284850 A1 * | 11/2008 | Blaesing | B60S 1/0822 348/148 |
| 2008/0290081 A1 * | 11/2008 | Biddell | A42B 3/245 219/203 |
| 2011/0297661 A1 * | 12/2011 | Raghavan | H05B 3/84 219/203 |
| 2011/0297665 A1 * | 12/2011 | Parker | H05B 3/22 219/494 |
| 2012/0103960 A1 | 5/2012 | Bressand et al. | |
| 2014/0071216 A1 * | 3/2014 | Hu | B41J 11/0015 347/102 |
| 2014/0217080 A1 * | 8/2014 | Hoke | B60H 1/00785 219/203 |
| 2017/0334366 A1 * | 11/2017 | Sliwa | B60R 11/04 |
| 2019/0013555 A1 * | 1/2019 | Bulgajewski | H01M 10/615 |
| 2019/0031116 A1 * | 1/2019 | Bulgajewski | B60R 11/04 |

FOREIGN PATENT DOCUMENTS

| | | |
|---|---|---|
| CN | 102782585 A | 11/2012 |
| DE | 1256812 B | 12/1967 |
| DE | 102009026021 A1 | 12/2010 |
| EP | 0158410 A1 | 10/1985 |
| EP | 0175550 A1 | 3/1986 |
| EP | 0340361 A2 | 11/1989 |
| JP | 2000-321348 A | 11/2000 |
| JP | 2003-521679 A | 7/2003 |
| JP | 3117480 U | 11/2005 |
| JP | 2008-517422 A | 5/2008 |
| JP | 2012-530646 A | 12/2012 |
| WO | 2009/072060 A1 | 6/2009 |

OTHER PUBLICATIONS

Annex to Communication for Oral Proceedings from corresponding European Application No. 15787793.7, dated Jul. 7, 2020 (6 pages).

* cited by examiner

TRANSMISSIVE FRONT-FACE HEATER FOR VEHICLE SENSOR SYSTEM

RELATED APPLICATIONS

The present application is a National Phase of International Application Number PCT/US2015/055180 filed Oct. 13, 2015 and claims priority of US Provisional Application Number 62/074,211 filed Nov. 3, 2014, which is hereby incorporated in its entirety by reference.

FIELD OF THE INVENTION

The present invention relates generally to vehicular systems and, in particular, to advanced vehicular sensing system systems.

BACKGROUND OF THE INVENTION

Sensors for sensing pedestrians, other vehicles, and obstacles in the vicinity of the a vehicle are being developed for use with advanced systems which can control a vehicle's accelerator and braking systems to regulate the distance between the vehicle and the other object. Ultimately, such systems may also be used in providing self-guiding or self-driving vehicles.

Sensors of this type, including radar, LIDAR, infrared video, visible-light video, and ultrasound, can be adversely affected by a covering of ice, sleet, or snow—materials likely to be experienced in real-world driving conditions. Placing shields or other materials in front of the sensor can also interfere with operation of the sensor. Particularly with respect to radar sensors, any conductive metal, such as electrical heater elements, placed over the radar sensor may block the radio wave propagation.

SUMMARY OF THE INVENTION

The present invention provides a front-face heater that may be placed over a vehicular sensing system to limit or remove the accumulation of sleet, ice, or snow. The heater employs a polymer positive temperature coefficient (PTC) material that may be configured to be transmissive to light, sound, and microwave radio frequency energy. By properly sizing and shaping the conductive heater electrodes communicating with the PTC material, interference with sensing energy from the sensor may be minimized despite the heater being placed in the way of the sensed energy.

Specifically, the present invention provides a vehicular sensing system having a sensor receiving sensed energy through a window area and having a heater positioned over the sensor, the heater positioned within the window area and comprised of a resistive film communicating with metallic conductors adapted to apply current to the resistive film. The resistive film and metallic conductors are configured to be substantially transparent to the sensed energy within the heater window area.

It is thus a feature of at least one embodiment of the invention to provide an energy transparent heater for automotive use that can be mounted in the path of the sensed energy to more quickly and completely melt ice, sleet, and snow accumulating in the energy path. By positioning the heater in the energy path, indirect heating of a window area such as may require additional energy and increased delay is avoided.

The metallic conductors may be applied to the resistive film within the window area in an interdigitated pattern.

It is thus a feature of at least one embodiment of the invention to provide for substantially uniform current flow and thus heating to the heater to eliminate hot spots, cold spots, and maximize energy efficiency.

The resistive film may be a positive temperature coefficient material.

It is thus a feature of at least one embodiment of the invention to provide a heater that may be largely self-regulating without the need for temperature measurement elements and thermostatic control.

The sensed energy may be microwave radiation, and the metallic conductors may have dimensions tuned to reject absorption of the microwave radiation.

It is thus a feature of at least one embodiment of the invention to provide the benefits of a window-located heater without degrading the microwave signal.

The metallic conductors may have a vertical width of less than two millimeters and a thickness of less than 0.05 millimeters.

It is thus a feature of at least one embodiment of the invention to balance the need for current distribution with a need to minimize metallic area in the path of the microwave beam such as may adsorb microwave energy.

The vehicle sensor may include mounting points for mounting the vehicle sensor to a vehicle in a predetermined orientation and the metallic conductors may extend horizontally across the window area when the vehicle sensor is mounted in the vehicle.

It is thus a feature of at least one embodiment of the invention to minimize diffractive effects in the horizontal plane such as may degrade the more important measurement axis of a microwave sensing system.

The heater provides at least 10 watts of heat.

It is thus a feature of at least one embodiment of the invention to provide sufficient heating capability for rapid deicing.

In one alternative embodiment, the sensed energy may be light and the sensor may include an optically transparent substrate supporting the heater elements, and the heater elements are substantially opaque and include a set of apertures for transmission of light.

It is thus a feature of at least one embodiment of the invention to provide a resistive-type heater that can work with optical sensing as well as microwave sensing.

The sensor may be a camera having a light sensor and lens for focusing light on the light sensor heater element that is placed with in a focal length of the lens.

It is thus a feature of at least one embodiment of the invention to minimize interference with the imaging of an imaging-type light sensor. By placing the opaque heater elements out of the focal plane, they may remain out of focus without creating image artifacts.

The sensed light may be infrared light and may include a controller for alternating the application of electrical current to the heater and the sensing of energy using the sensor.

It is thus a feature of at least one embodiment of the invention to permit coexistence of a heater and an infrared sensor.

Alternatively, the sensed energy may be ultrasound energy, and the sensor may be an ultrasound transducer transmitting ultrasonic energy through an acoustically transparent window material, and the resistive material and metallic conductors are adhered directly to the window material.

It is thus a feature of at least one embodiment of the invention to minimize blockage of ultrasound energy by reducing transitions between materials of different sound propagation properties.

Other features and advantages of the invention will become apparent to those skilled in the art upon review of the following detailed description, claims and drawings in which like numerals are used to designate like features.

Figure 1:
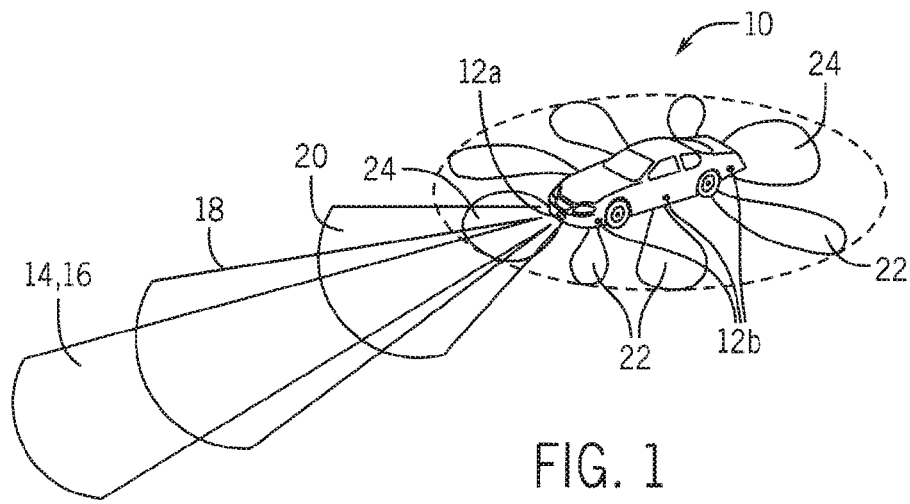
FIG. 1 is a perspective view of a vehicle having a variety of different obstacle sensors.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE PREFERRED EMBODIMENTS

Figure 2:
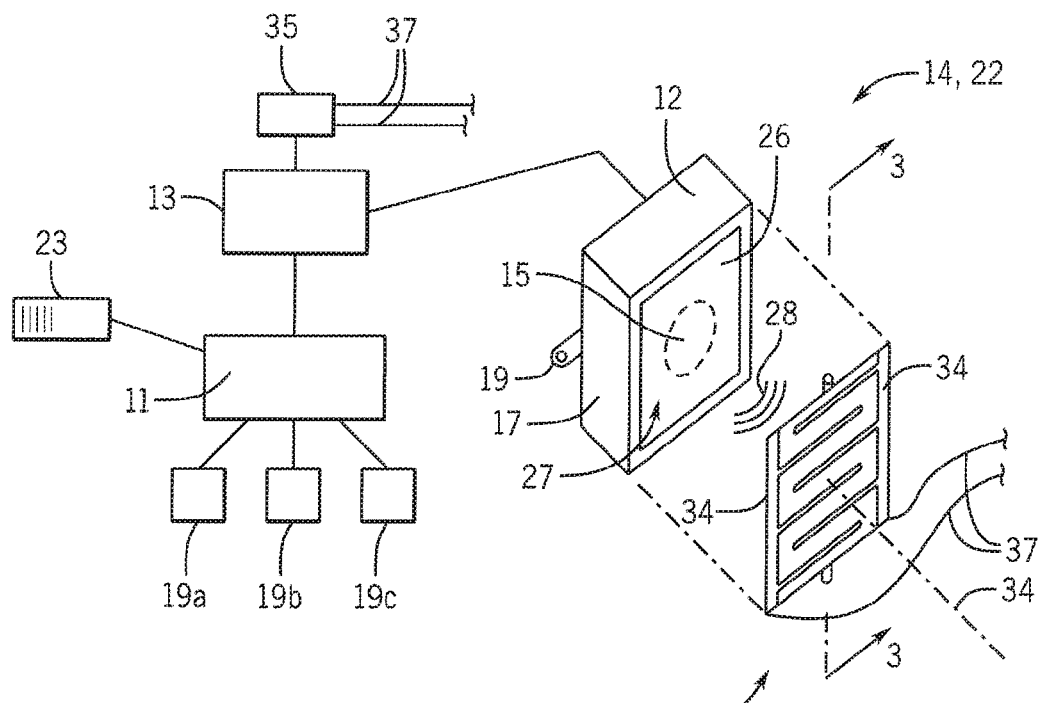
FIG. 2 is an exploded block diagram of a sensor and a front-surface heater as may be applied over the face of the sensor in the present invention.

Referring now to FIGS. 1 and 2, a vehicle 10 suitable for use with the present invention may incorporate a variety of sensing units 12 for monitoring potential obstacles in the path or vicinity of the vehicle 10. The sensing units 12 may incorporate a sensor 15 within a housing 17, for example, the former for receiving and sensing a sensed energy.

The sensor 15 may exchange electrical signals with a sensor interface circuit 13 which in turn communicates with a vehicular computer 11, the latter managing vehicle control tasks, for example, by controlling steering actuators 19a, braking actuators 19b, and engine acceleration actuators 19c. The sensors 15 may also communicate with vehicle cockpit display systems 23 to provide information to the vehicle occupants.

The housing 17 may include mounting elements 19 for mounting the housing 17 in a predetermined orientation with respect to the vehicle 10 and will generally provide sealing against environmental contamination and the like.

Front facing sensing units 12a may provide, for example, a 77 gigahertz long range radar 14 providing 1 to 120 meters of sensing capability. Alternatively or in addition, the front facing sensing units 12a may include far infrared (night vision) imaging 18 sensors, providing sensing from 0.2 to 80 meters of sensing capability, normal visible-light video 20 sensors (or LIDAR 16), providing up to 280 meters of sensing capability, short range radar 22, for example, using twenty-four gigahertz short range radar and providing 0.2 to 20 meters of sensitivity, and ultrasonic sensing 24 providing 0.2 to 1.5 meters of sensing range. Short-range radar and ultrasonic sensing may also be provided by side sensing units 12b.

Referring now to FIG. 2, each of the sensing units 12 may have a window area 26 through which the sensing unit 12 receives sensing energy 28 inward toward the vehicle 10 along a sensing axis 31. This sensing energy 28 may be available environmentally or generated by an energy source associated with the sensing unit 12 and in certain cases being the sensor 15. The received energy, for example, may be long- or short-range radar, infrared light, and visible spectrum light including but not limited to a laser beam, or ultrasound.

The invention may provide a front-face heater 30 placed over the window area 26 between the window area 26 and sources of environmental exposure to ice, sleet, and snow. The front-face heater 30 may receive electrical power through leads 37 which provide energy to heat the front-face heater 30 to melt received sleet, ice, or snow that might otherwise block outward transmission of the sensing energy 28 or inward receiving of the sensed energy. In this regard, the front-face heater 30 may desirably have a regulated surface temperature above the melting point of ice. In one embodiment the heater may have a wattage of 15 to 20 watts.

Power from the electrical leads 37 may be provided by a power control circuit 35 (for example, a solid-state switching device such as a transistor or the like) switching a DC voltage to the leads 37, for example, based on a range of air temperature sensed by separate temperature sensors (not shown) or at periodic intervals interleaved with sensing intervals in the case of an infrared sensor where some interference may be present. The DC voltage to the leads 37 may be floating or tied to voltages used by the sensing unit 12 itself, including, for example, radiofrequency modulators and demodulation amplifiers in the case of radar.

Figure 3:
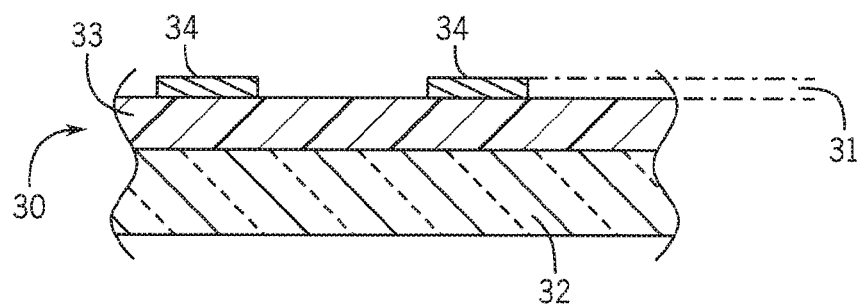
FIG. 3 is a cross-section taken along line 3-3 of FIG. 2 showing construction of the front-surface heater using a thin sheet of polymer material with an overlay of conductive electrodes.

Referring now to FIG. 3, the front-face heater 30 may provide for a thin sheet of transparent and in some cases optically clear polymer material providing a substrate 32. The substrate 32 is desirably water-resistant and may be treated to be water repellent and may face outward with respect to the window area 26 to provide protection of the sensing unit 12 against the environment. Alternatively, or in addition, additional energy transmissive protective housing (not shown) may be placed in front of the front-face heater 30 along the direction of propagation of the sensing energy 28.

Coated on a rear face of the clear polymer material is a PTC (positive temperature coefficient) material 33 having the property of conducting electricity with a positive temperature coefficient of resistance. A positive temperature coefficient of resistance causes the amount of electrical flow to vary according to the temperature of the material, with increased electrical flow at lower temperatures and decreased electrical flow at higher temperatures. This property provides for a self-regulating temperature of the PTC material 33 when a substantially constant voltage source is applied across the PTC material 33.

In one embodiment, the PTC material 33 may comprise an ethylene vinyl acetate copolymer resin, such as DuPont 265 which comprises about 28 percent vinyl acetate monomer and about 72 percent ethylene monomer modified to have a sheet resistivity of 15,000 ohms per square. To achieve this electrical characteristic, this ethylene vinyl acetate copolymer resin may be first dissolved in an aromatic hydrocarbon solvent such as naphtha, xylene, or toluene at about 80 degrees C. and let down to where twenty percent of the total weight of the solution is solids. Carbon black, such as CABOT VULCAN PF, maybe added and mixed to bring the total solid content to about 50 percent by weight. This material is then passed through a three-roll dispensing mill having a 0.1 to 1 mil nip clearance to further disperse and crush the solids. The material is further let down with about a twenty percent solids resin and solvent solution until the desired sheet resistivity is achieved.

Positive temperature coefficient (PTC) heaters, suitable for the present invention, are also disclosed in U.S. Pat. Nos. 4,857,711 and 4,931,627 to Leslie M. Watts hereby incorporated in their entirety by reference.

The rear surface of the PTC material 33 may support interdigitated electrodes 34 that apply voltage across the PTC material 33 promoting current flow through the PTC material 33 generally along the plane of its extent. Electrodes 34 may be, for example, screenprinted using conductive metallic inks or vapor deposited, for example, of aluminum or the like or applied as a thin decal or etched from an adhered film using integrated circuit techniques or a variety of other manufacturing processes. In one example, NazDar 9600 series ink with a twenty percent flattening paste added thereto is suitable for use in forming the electrodes 34 in one embodiment of the invention. This ink is commercially available from NazDar Inc, of Kansas, USA. The conductive electrical pattern of the electrodes 34 may be deposited on the substrate 32 in a thickness ranging between about 8 to 10 microns.

Figure 4:
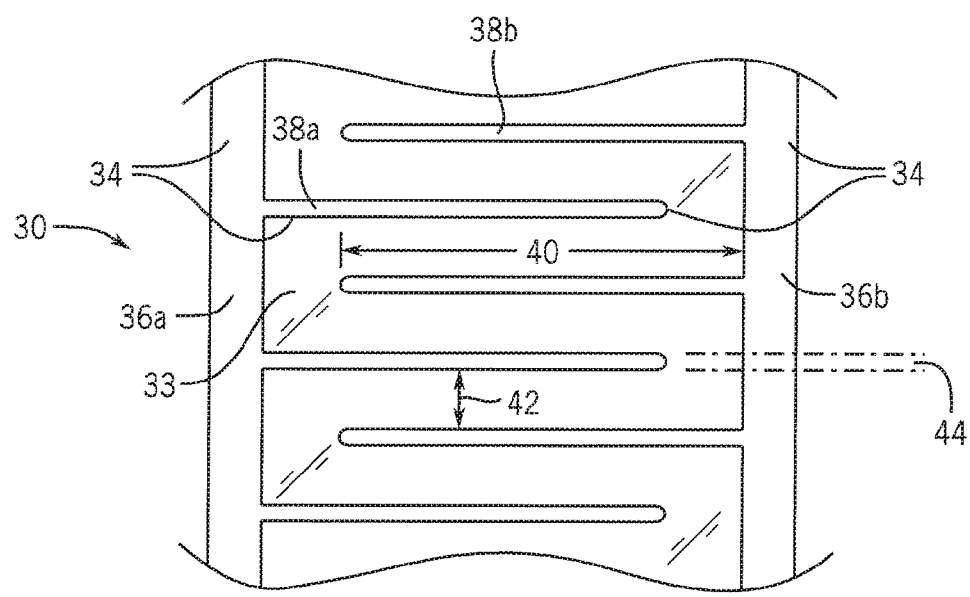
FIG. 4 is a rear elevational view of the heater of FIGS. 2 and 3 showing important dimensions with respect to promoting the transmission of sensing energy.

Referring now to FIG. 4, in one example embodiment, a first electrode bus strip 36a of the interdigitated electrodes 34 may extend along a vertical left edge of the area of the front-face heater 30 displaced out of the path of the sensing energy 28. A second electrode bus strip 36b may be positioned parallel to and opposite the bus strip 36a also displaced from the center of the front-face heater 30.

Extending inward, horizontally and perpendicularly to the extent of the bus strips 36 and from the bus strips 36, may be interdigitated finger electrodes 38a and 38b each electrically communicating with an alternate respective one of the first electrode bus strip 36a and second electrode bus strip 36b.

Radar System

A typical radar sensor may provide an 80 millimeter by 80 millimeter area window area 26. In this case the sensing unit 12 includes both a microwave transmitting and microwave receiving antenna 27. The front face heater 30 may extend over the window area 26.

In the case of microwave radiation for use with radar, the absorption by the finger electrodes 38 may be limited by controlling their tuning as well as minimizing their size and extent. For the case of 77 gigahertz microwave radiation, the vertical thickness 44 of the finger electrodes 38 will be less than 0.2 millimeters and desirably less than 0.15 millimeters. In addition the finger electrodes 38 may have a thickness of less than 0.05 millimeters and desirably less than 0.02 millimeters.

Generally, the spacing 42 between the finger electrodes 38 will be larger than the wavelength of the radar intended to be passed so as to reduce interference. Ideally, the spacing will be substantially larger than twelve millimeters for low-frequency 24 gigahertz microwave radiation and larger than three millimeters in the case of high-frequency 77 gigahertz radar and desirably a multiple of these values. Generally, the tuning will reduce the thickness 44 to a fraction of the wavelength of the microwave radiation and will set the lengths 40 not to equal an integral multiple of the wavelength.

The invention also contemplates that radiofrequency trap structures (not shown) may be placed in the finger electrodes 38, for example, by creating radiofrequency chokes using capacitive elements and distributed inductance or the like. Alternatively, shorting structures such as diodes may be used to shunt the finger electrodes 38 to minimize electrical resonance, for example, as switched synchronously with the application of a radiofrequency pulse. At the times of microwave transmission and reception, heating currents can be turned off.

The orientation of the finger electrodes 34 will generally be such as to reduce diffractive effects in the desired axis of highest resolution (typically horizontal) by running the electrodes 34 in a horizontal direction. The invention contemplates that other methods of reducing interference including orienting the finger electrodes 38 according to any polarization (horizontal or vertical) of the radar signal; randomly varying finger length and spacing may also be employed.

Light Sensing System (Camera, LIDAR, Infrared)

Figure 5:
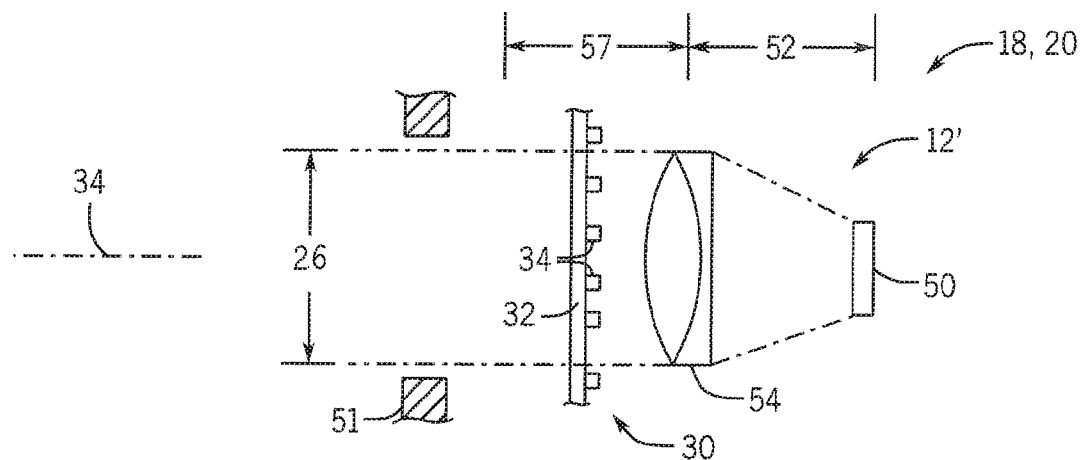
FIG. 5 is a side elevational view of an optical sensing system when used with the present invention showing positioning of the heater within the focal plane of the camera lens.

Referring now to FIG. 5, an alternative sensing unit 12' may provide a camera having a light sensor 50, for example, a charge coupled device circuit at a focal length 52 behind a lens assembly 54 projecting an image of a roadway or the like on the surface of the light sensor 50. In this case, the heater 30 may be placed within the focal distance 57 of the lens assembly 54 in front of the lens assembly 54 to minimize its effect on the image formed on light sensor 50. A beam stop 51 may be positioned in front of the heater 30 or behind the heater 30 to define the window area 26.

Figure 6:
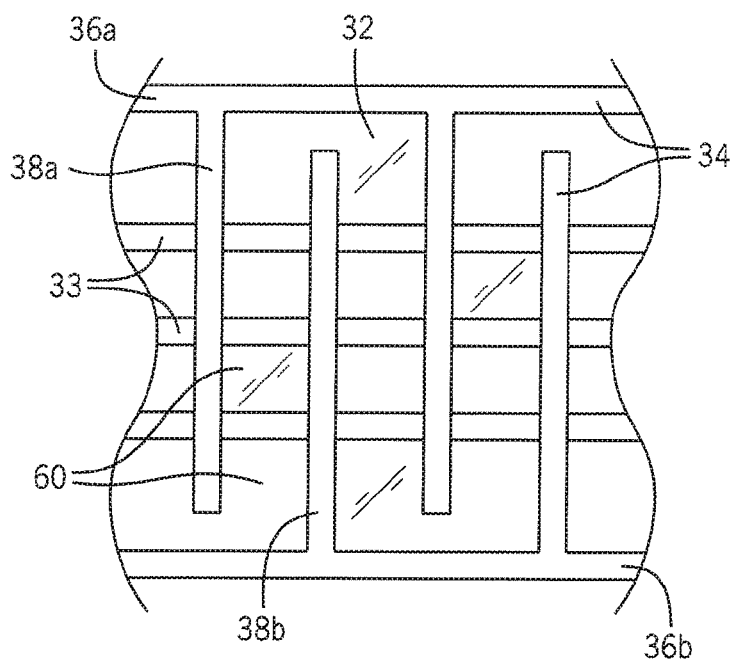
FIG. 6 is a figure similar to that of FIG. 4 showing an alternative construction of the heater element to provide for the passage of light energy.

Referring also to FIG. 6, in this case the PTC material 33 may be laid in strips passing perpendicularly between the finger electrodes 38 to provide openings 60 therebetween revealing the transparent substrate 32 allowing light to pass therethrough without diffusion or aberration. In this way an opaque PTC material 33 may be used or PTC material 33 that is light diffusing. Desirably the size of the openings 60 will be maximized to the point where suitable heat is still generated with desirable heating uniformity and ample conductor size is provided by finger electrodes 38 for the necessary current.

Ultrasound System

Figure 7:
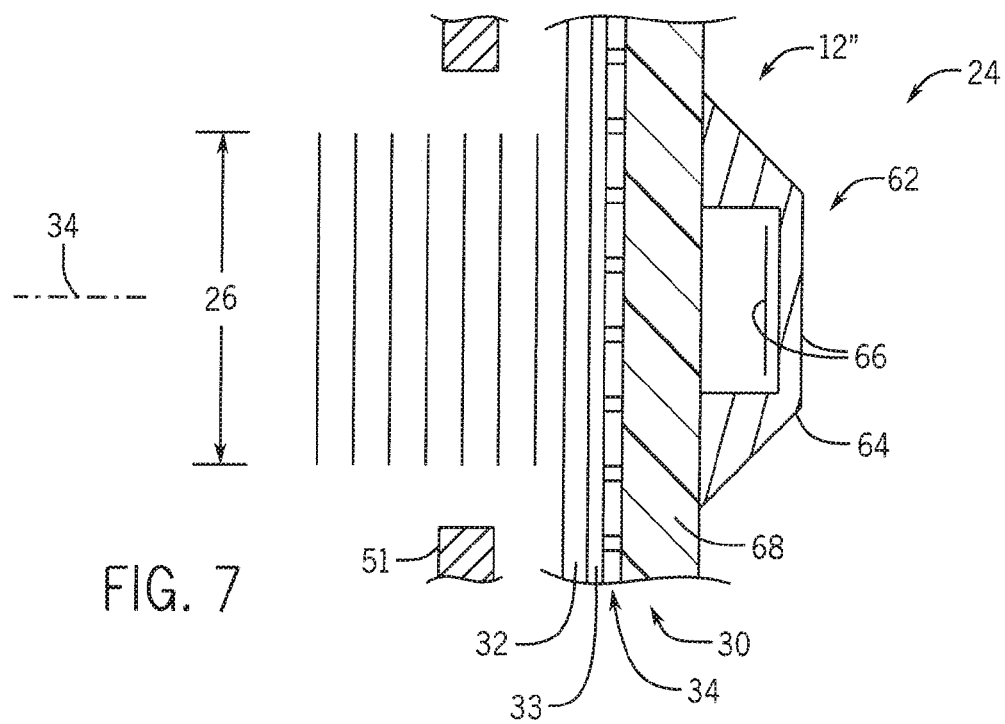
FIG. 7 is a figure similar to that of FIG. 5 showing an ultrasound sensing system used with the present invention.
Figure 8:
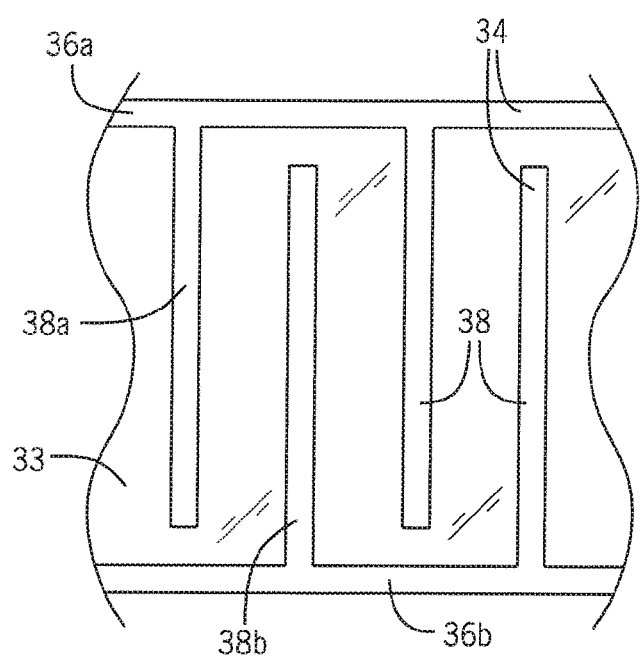
FIG. 8 is a figure similar to FIG. 7 showing arrangement of the heater elements.

Referring now to FIGS. 7 and 8, the heater 30 may be also applied to an ultrasonic transducer 62 providing the sensing unit 12''. Here, the transducer 62 may provide, for example, a piezoelectric material 64 to which electricity may be applied by means of surface electrodes 66. The piezoelectric material 64 may be coupled to a transmission window 68 of an ultrasound transmitting material as is generally understood in the art. In this case, the heater 30 may be adhered directly to a front or rear face of the transmission window 68. Ideally, the combined electrodes 34, PTC material 33 and substrate 32 has similar acoustomechanical properties to the transmission window 68 (e.g., density, modulus of elasticity, etc.) to prevent reflections at the interface. Interference with the sensing energy 28 can also result from mechanical absorption which is treated by controlling the thickness of the polymer material of the substrate 32. The electrodes 34 and finger electrodes 38 may be applied directly to the transmission window 68 with a space-filling adhesive having similar acoustic properties to the transmission window 68 or intermediate properties between the transmission window 68 and the substrate 32.

Alternatively, the PTC material 33 and electrodes 34 may be applied directly to the transmission window 68, the latter of which is implicitly acoustically matched to the piezoelectric material 64 at the intended excitation frequency. Sound absorbing channeling stops 51 may define an energy-receiving window area 26.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A vehicular sensing system comprising:
a sensor receiving sensed energy through a window area; and
a heater positioned over the sensor within the window area, the heater comprising a resistive film communicating with metallic conductors adapted to apply a current to the resistive film, wherein the metallic conductors comprise finger electrodes that extend along a surface of the heater;
wherein the resistive film and metallic conductors are configured to be substantially transparent to the sensed energy within the window area, and
wherein the resistive film is laid in strips passing perpendicular to the finger electrodes.

2. The vehicular sensing system of claim 1 wherein the metallic conductors are applied to the resistive film within the window area in an interdigitated pattern.

3. The vehicular sensing system of claim 2 wherein the resistive film is a positive temperature coefficient material.

4. The vehicular sensing system of claim 3 wherein the sensed energy is microwave radiation and wherein the metallic conductors have dimensions tuned to minimize interference of the microwave radiation.

5. The vehicular sensing system of claim 4 wherein the finger electrodes have a vertical width parallel to an electrode bus strip of less than two millimeters, wherein the electrode bus strip extends vertically along an edge of the heater displaced out of the path of sensed energy, and wherein the finger electrodes extend horizontally and perpendicularly with respect to the electrode bus strip.

6. The vehicular sensing system of claim 5 wherein the finger electrodes have a thickness perpendicular to a plane of the resistive film of less than 0.05 millimeters.

7. The vehicular sensing system of claim 6 wherein the vehicle sensor includes mounting points for mounting the vehicle sensor to a vehicle in a predetermined orientation and wherein the finger electrodes extend horizontally, perpendicular to the electrode bus strip, across the window area when the vehicle sensor is mounted in the vehicle.

8. The vehicular sensing system of claim 1 wherein the heater provides at least 10 watts of heat.

9. The vehicular sensing system of claim 3 wherein the sensed energy is light and wherein the window area includes an optically transparent substrate supporting the heater and wherein the heater is substantially opaque and include a set of apertures for transmission of light.

10. The vehicular sensing system of claim 9 wherein the sensor provides a camera having a light sensor and a lens for focusing light on the light sensor, wherein the heater is placed within a focal length of the lens.

11. The vehicular sensing system of claim 10 wherein the sensed energy is infrared light and further including a controller for alternating an application of electrical current to the heater and the sensing of energy using the sensor.

12. The vehicular sensing system of claim 3 wherein the sensed energy is ultrasound energy and wherein the sensor is an ultrasound transducer transmitting ultrasonic energy through an ultrasound transmitting window material and wherein the resistive material and metallic conductors are adhered directly to the ultrasound transmitting window material.

13. The vehicular sensing system of claim 1, wherein the strips provide openings therebetween revealing a transparent substrate, and wherein the transparent substrate allows light to pass therethrough without diffusion or aberration.

14. The vehicular sensing system of claim 1, wherein a beam stop is positioned in front of the heater to define the window area.

15. The vehicular sensing system of claim 1, wherein the sensor is positioned within a housing, and wherein the window area is configured to the housing.

16. The vehicular sensing system of claim 1, wherein the window area is between the heater and the sensor.

17. A vehicular sensing system, comprising:
a sensing unit comprising a housing that provides sealing against environmental contamination, wherein the sensing unit receives sensed energy through a window area; and
a heater placed over the window area of the sensing unit between the window area and sources of environmental exposure to ice, sleet, or snow, the heater comprising a resistive film communicating with metallic conductors adapted to apply a current to the resistive film,
wherein the resistive film and metallic conductors are configured to be substantially transparent to the sensed energy within the window area.

18. The vehicular sensing system of claim 17, wherein the heater comprises a substrate that faces outward with respect to the sensing unit.

19. A vehicular sensing system, comprising:
a sensor receiving light through a window area; and
a heater positioned over the sensor within the window area, the heater comprising a resistive film communicating with metallic conductors adapted to apply a current to the resistive film, wherein the resistive film is a positive temperature coefficient material that is opaque or light diffusing, and wherein an optically transparent substrate supports the heater, wherein the resistive film and the metallic conductors are configured to be substantially transparent to the light within the window area, wherein the metallic conductors comprise a first electrode bus strip extending vertically along an edge of the heater displaced out of the path of light, a second electrode bus strip positioned parallel to and opposite the first electrode bus strip and displaced out of the path of light, and interdigitated finger electrodes each electrically communicating with an alternate respective one of the first and second electrode bus strips and extending inwardly, horizontally, and perpendicularly with respect to the first and second bus strips, and wherein the positive temperature coefficient material is laid in strips passing perpendicular to the finger electrodes to provide openings therebetween revealing the transparent substrate.

* * * * *